US012502957B2

(12) United States Patent
Tomida et al.

(10) Patent No.: US 12,502,957 B2
(45) Date of Patent: Dec. 23, 2025

(54) VEHICLE STATE DISPLAY DEVICE

(71) Applicant: MITSUBISHI JIDOSHA KOGYO KABUSHIKI KAISHA, Tokyo (JP)

(72) Inventors: Yuichi Tomida, Tokyo (JP); Hiroyuki Suzuki, Tokyo (JP); Masako Abe, Tokyo (JP); Yoshikazu Teshima, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 351 days.

(21) Appl. No.: 17/642,845

(22) PCT Filed: Nov. 16, 2020

(86) PCT No.: PCT/JP2020/042558
§ 371 (c)(1),
(2) Date: Mar. 14, 2022

(87) PCT Pub. No.: WO2021/152959
PCT Pub. Date: Aug. 5, 2021

(65) Prior Publication Data
US 2022/0371439 A1 Nov. 24, 2022

(30) Foreign Application Priority Data
Jan. 28, 2020 (JP) ................. 2020-011586

(51) Int. Cl.
B60K 35/22 (2024.01)
B60K 35/28 (2024.01)
(Continued)

(52) U.S. Cl.
CPC ............. B60K 35/22 (2024.01); B60K 35/81 (2024.01); B60K 35/28 (2024.01); B60K 35/29 (2024.01);
(Continued)

(58) Field of Classification Search
CPC ........ B60K 35/00; B60K 35/28; B60K 35/29; B60K 2360/169; B60K 2360/171;
(Continued)

(56) References Cited

U.S. PATENT DOCUMENTS

2012/0310441 A1 12/2012 Fukushiro
2014/0143702 A1 5/2014 Matsuoka et al.
2019/0047589 A1 2/2019 Matsushita et al.

FOREIGN PATENT DOCUMENTS

CN 109383292 A 2/2019
CN 106809219 B * 12/2019 ............. B60K 35/00
(Continued)

OTHER PUBLICATIONS

Making Sense of the Displays (https://www.ecrostech.com/prius/original/Understanding/MakingSenseOfDisplays.htm); Last edited Aug. 14, 2003 (Year: 2003).*

(Continued)

Primary Examiner — Navid Z. Mehdizadeh
Assistant Examiner — Micah Chuen-Him Cheng
(74) Attorney, Agent, or Firm — BIRCH, STEWART, KOLASCH & BIRCH, LLP

(57) ABSTRACT

A vehicle state display device of a vehicle including an engine that drives driving wheels includes a display unit that displays an energy transmission state of the vehicle, a vehicle configuration display control unit, and a transmission state display control unit. The transmission state display control unit displays, between an engine display and a driving wheel display on the display unit during operation of the engine, a first transmission display indicating a transmission of energy between the engine and the driving wheels, and changes a display mode of the first transmission display between a case where the vehicle is traveling and a case where the vehicle is stopped.

7 Claims, 3 Drawing Sheets

(51) Int. Cl.
 B60K 35/29 (2024.01)
 B60K 35/81 (2024.01)

(52) U.S. Cl.
 CPC .. *B60K 2360/169* (2024.01); *B60K 2360/171* (2024.01); *B60K 2360/1876* (2024.01); *B60K 2360/188* (2024.01)

(58) Field of Classification Search
 CPC ...... B60K 2360/1876; B60K 2360/188; B60K 6/22; B60K 28/10; B60K 35/22; B60K 6/485; B60W 20/00
 See application file for complete search history.

(56) References Cited

FOREIGN PATENT DOCUMENTS

| | | |
|---|---|---|
| JP | 2000-247164 A | 9/2000 |
| JP | 2002-247706 A | 8/2002 |
| JP | 2011-93491 A | 5/2011 |
| JP | 5212518 B2 | 6/2013 |
| JP | 2019-34570 A | 3/2019 |
| WO | WO 2013/132547 A1 | 9/2013 |

OTHER PUBLICATIONS

Machine Translation—CN-106809219-B (Year: 2019).*
International Search Report (PCT/ISA/210) issued in PCT/JP2020/042558, dated Jan. 12, 2021.
Written Opinion of the International Searching Authority (PCT/ISA/237) issued in PCT/JP2020/042558, dated Jan. 12, 2021.
Chinese Office Action and Search Report for Chinese Application No. 202080064343.8, dated Nov. 15, 2024, with English translation.

* cited by examiner

VEHICLE STATE DISPLAY DEVICE

TECHNICAL FIELD

The present disclosure relates to a vehicle state display device that displays an energy transmission state in a vehicle on a display.

BACKGROUND ART

As a related technique, a technique is known in which, in a hybrid vehicle or the like including a plurality of drive sources, an energy transmission state in the vehicle is displayed so as to be visible to a user.

For example, Japanese Patent No. 5212518 discloses a driving state display device of a vehicle that displays a transmission state of energy of the vehicle. When both of two conditions that the vehicle is in a stopped state and that a brake operation is being performed are satisfied, even if energy is transmitted to an axle, the driving state display device does not display the fact.

In the related art described above, when a driver performs the brake operation and the vehicle is in the stopped state, the display of the energy transmission to the axle is not performed. Here, in a vehicle having an engine as a main drive source, even when the vehicle is stopped, a state in which the engine is driven occurs relatively frequently. At this time, if the display of the energy transmission from the engine to the axle (driving wheel) is not performed, the driver may feel uncomfortable, and there is room for improvement.

SUMMARY OF INVENTION

The present disclosure provides a vehicle state display device that performs display closer to the sense of a driver when displaying an energy transmission state in a vehicle.

According to an aspect of the present disclosure, a vehicle state display device of a vehicle including an engine that drives driving wheels includes: a display unit configured to display an energy transmission state of the vehicle; a vehicle configuration display control unit configured to display, on the display unit, an engine display representing the engine and a driving wheel display representing the driving wheels; and a transmission state display control unit configured to control a display mode of a first transmission display, which is displayed between the engine display and the driving wheel display and indicates transmission of energy between the engine and the driving wheels. The transmission state display control unit is configured to display the first transmission display during operation of the engine, and change the display mode of the first transmission display between a case where the vehicle is traveling and a case where the vehicle is stopped.

According to the aspect of the present disclosure, the vehicle state display device displays the first transmission display indicating the transmission of the energy between the engine and the driving wheels during the operation of the engine, and stops the display of the first transmission display during the stop of the engine. Accordingly, it is possible to switch the presence or absence of the first transmission display in conjunction with the operation state of the engine, which is easily recognized by the driver, and it is possible to prevent a deviation from occurring between the display of the vehicle state display device and the feeling of the driver.

In addition, since the vehicle state display device changes the display mode of the first transmission display based on whether the vehicle is traveling during the display of the first transmission display, it is possible to cause the driver to recognize whether the energy is actually transmitted from the engine to the driving wheels.

DESCRIPTION OF EMBODIMENTS

Hereinafter, preferred embodiments of a vehicle state display device according to the present disclosure will be described in detail with reference to the accompanying drawings.

Figure 1:
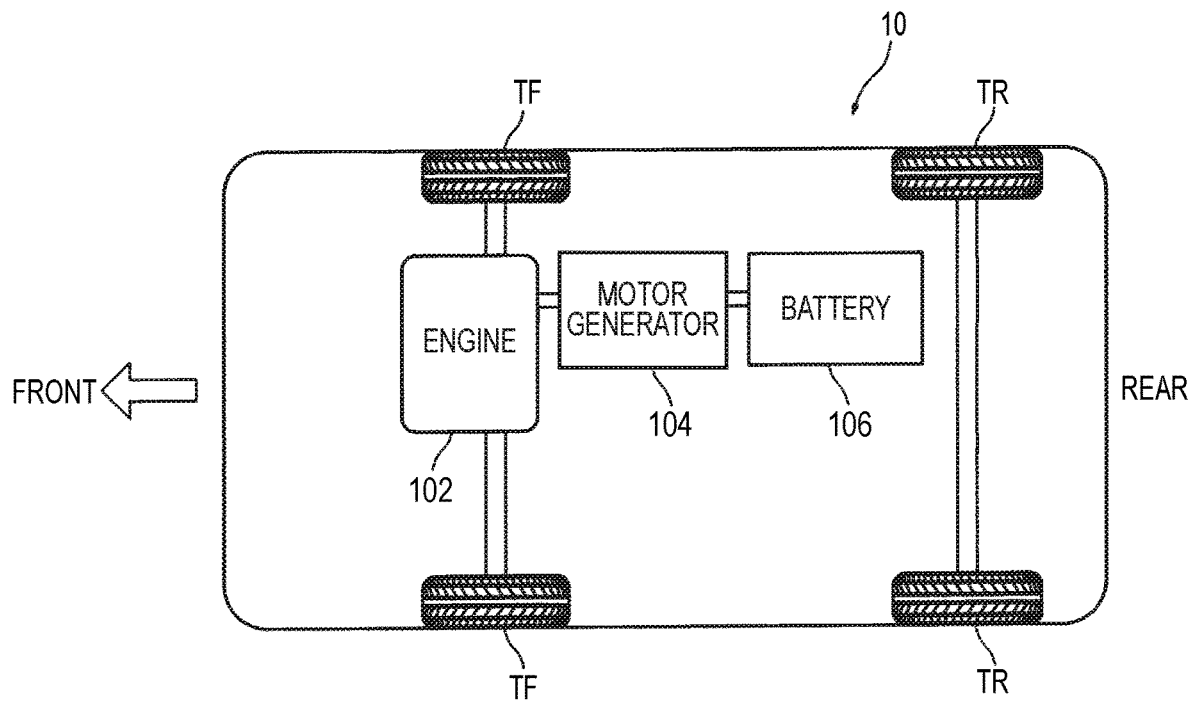
FIG. 1 is a diagram showing a configuration of a vehicle on which a vehicle state display device according to an embodiment is mounted.

FIG. 1 is a diagram showing a configuration of a vehicle on which a vehicle state display device according to an embodiment is mounted. A vehicle 10 includes an engine 102, a motor generator 104, a battery 106, and tires (front wheels TF and rear wheels TR). The vehicle 10 employs a so-called mild hybrid system, and uses the engine 102 as a main drive source and assists the engine 102 by the motor generator 104 in a predetermined traveling state to improve fuel consumption (reduce the amount of fuel consumed by the engine 102).

More specifically, the motor generator 104 is connected to the engine 102 by a belt, and transmits the rotation of the motor generator 104 to an output shaft of the engine 102 to rotate driving wheels (the front wheels TF in the present embodiment). The transmission of a driving force from the motor generator 104 to the engine 102 is performed, for example, during fuel consumption assistance or acceleration assistance of the vehicle 10. In the fuel consumption assist, a load of the engine 102 is reduced and the fuel consumption is improved by assisting a part of the driver requested output by the motor generator 104 during traveling. In the acceleration assist, the acceleration performance is improved by assisting the delay of the output of the engine 102 with respect to the driver requested output during full throttle acceleration. In addition, by using the motor generator 104 as a starter motor of the engine 102, the engine 102 can be started quickly and quietly.

In addition, when the vehicle 10 decelerates or when a charging rate of the battery 106 decreases, the driving force of the engine 102 is transmitted to the motor generator 104 to drive the motor generator 104 as a generator, and the generated electric power is supplied to the battery 106 to charge the battery 106. In regenerative power generation during the deceleration of the vehicle 10, the motor generator 104 generates electric power using deceleration energy during fuel cut. At this time, a power generation amount may be switched depending on whether a brake pedal is depressed in consideration of the drivability (deceleration feeling). In addition, in combustion power generation when the charging rate of the battery 106 decreases, by actively rotating the engine 102 using fuel, the motor generator 104 generates electric power, and the battery 106 is charged in preparation for the next acceleration assist.

The battery 106 is, for example, a battery of about 48 V, and is provided separately from a battery of 12 V that accumulates driving electric power for electric components of the vehicle 10 in order to accumulate driving electric power for the motor generator 104.

That is, the vehicle 10 includes the engine 102 that drives the driving wheels, the battery 106 that accumulates the electric power used for assisting the driving of the driving wheels, and the motor generator 104 that operates using the electric power of the battery 106 to drive the driving wheels, and performs the regenerative power generation using the rotational force of the driving wheels to supply the electric power to the battery 106 during the deceleration of the vehicle 10.

The configuration of the vehicle 10 in the present embodiment is an example, and the present disclosure is applicable to various types of known vehicles.

Figure 2:
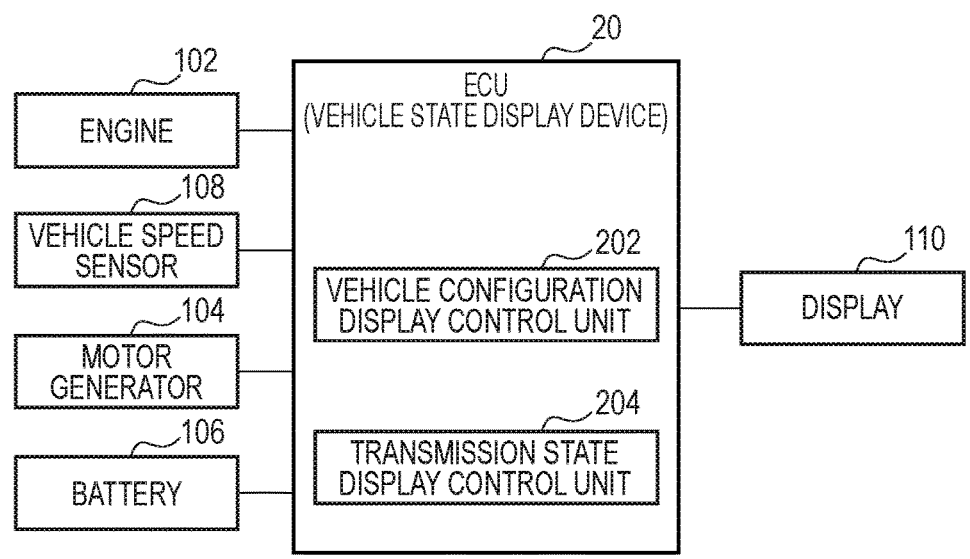
FIG. 2 is a block diagram showing a functional configuration of the vehicle state display device according to the embodiment.

FIG. 2 is a block diagram showing a functional configuration of the vehicle state display device according to the embodiment.

The vehicle 10 includes a vehicle speed sensor 108, a display unit 110 (for example, a display), and an electronic control unit (ECU) 20 in addition to the engine 102, the motor generator 104, and the battery 106 described above.

The vehicle speed sensor 108 detects a rotation speed of each wheel of the vehicle 10, and calculates an average value of the rotation speed of each wheel as a traveling speed of the vehicle 10.

The display 110 is disposed at a position (for example, in an instrument panel) where a driver who is driving can visually recognize the display 110.

The ECU 20 is a microcomputer that includes a CPU, a ROM that stores a control program or the like, a RAM that serves as an operation region of the control program, an EEPROM that rewritably holds various data, an interface unit that serves as an interface with peripheral circuits or the like, or the like, and functions as a vehicle state display device in the present embodiment.

Actually, an engine control unit for controlling the engine 102 is interposed between the engine 102 and the ECU 20, a motor control unit for controlling the motor generator 104 is interposed between the motor generator 104 and the ECU 20, and a battery control unit for controlling the battery 106 is interposed between the battery 106 and the ECU 20.

The ECU 20 functions as a vehicle state display device that displays the energy transmission state of the vehicle 10 on the display 110 by the CPU executing the control program. More specifically, the vehicle state display device includes a vehicle configuration display control unit 202 and a transmission state display control unit 204.

The vehicle configuration display control unit 202 displays a display (icon) indicating the configuration of the vehicle 10 on the display 110. In the present embodiment, the vehicle configuration display control unit 202 displays, on the display 110, an engine display Ei representing the engine 102, a driving wheel display Ti representing the driving wheels, and a battery display Bi representing the battery 106. In the present embodiment, it is assumed that a base color of the display 110 is a low-brightness color such as black.

Figure 4:
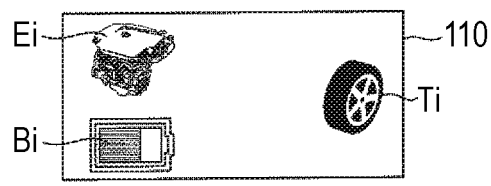
FIG. 4 is an explanatory diagram showing a display example of a display.

As shown in FIG. 4 or the like, the engine display Ei and the driving wheel display Ti are icons that schematically represent, for example, the external appearances of the engine 102 and the driving wheels (tires), respectively. In addition, the battery display Bi is, for example, an icon having a shape in which the battery 106 is schematically represented as a dry battery. An area of an internal indicator (shaded portion) changes in conjunction with the charging rate of the battery 106. For example, the battery display Bi in FIG. 4 indicates a state in which the charging rate is about 60%, and the battery display Bi in FIG. 9 indicates a state in which the charging rate is close to 100% (full charged). The lower the charging rate of the battery 106, the smaller the area of the indicator.

That is, the vehicle configuration display control unit 202 displays, on the display 110, a charging rate display indicating the charging rate of the battery 106 by a display area of a color different from the background. In the present embodiment, it is assumed that a display color of the indicator in the battery display Bi is blue.

The transmission state display control unit 204 displays, between the icons displayed by the vehicle configuration display control unit 202, a transmission display indicating transmission of energy between the configurations indicated by the icons, and controls the display mode. In the present embodiment, the transmission state display control unit 204 displays, for example, between the engine display Ei and the driving wheel display Ti, a first transmission display F1 indicating transmission of energy between the engine 102 and the driving wheels.

Figure 5:
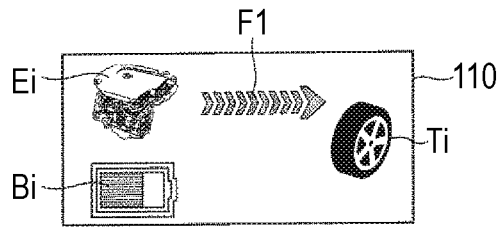
FIG. 5 is an explanatory diagram showing a display example of a display.
Figure 6:
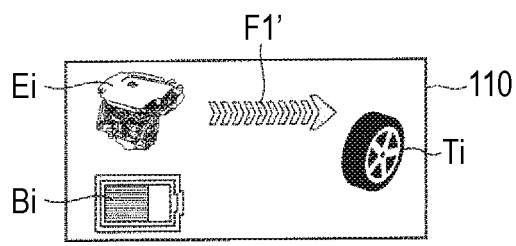
FIG. 6 is an explanatory diagram showing a display example of a display.

FIGS. 5 and 6 are display examples of the first transmission display F1.

The first transmission display F1 indicates a state in which a rotational force is applied to the driving wheels by the driving of the engine 102, and is represented by an arrow directed from the engine display Ei to the driving wheel display Ti in the present embodiment. Patterns of transmission displays (the first transmission display F1, a second transmission display F2, and a third transmission display F3) are not limited to the arrows, and may be any patterns as long as the driver can intuitively recognize the flow of energy.

When the engine 102 is operating, the transmission state display control unit 204 displays the first transmission display F1 as shown in FIG. 5, but when the engine 102 is stopped, the transmission state display control unit 204 stops the display of the first transmission display F1 as shown in FIG. 4. This is because when the engine 102 is operating, energy can be transmitted from the engine 102 to the driving wheels by an operation or the like (for example, an accelerator operation) of the driver, and when the engine 102 is stopped, energy cannot be transmitted from the engine 102 to the driving wheels.

In addition, the transmission state display control unit 204 changes the display mode of the first transmission display F1 between a case where the vehicle 10 is traveling when the first transmission display F1 is displayed (that is, when the engine 102 is operating) and a case where the vehicle 10 is stopped when the first transmission display F1 is displayed.

In the present embodiment, when the vehicle 10 is stopped while the engine 102 is operating, the first transmission display F1 is displayed in gray (achromatic color) as shown in FIG. 5. On the other hand, when the vehicle 10 is traveling while the engine 102 is operating, the first transmission display (denoted by F1') is displayed in a chromatic color, for example, an orange color, as shown in FIG. 6.

That is, in the case where the vehicle 10 is traveling during the display of the first transmission display, the transmission state display control unit 204 displays the first transmission display in a color having a saturation higher than that in the case where the vehicle 10 is stopped during the display of the first transmission display.

Accordingly, the driver can intuitively recognize that the energy transmission from the engine 102 to the driving wheels is being performed and the driving wheels are actually driven (traveling: displayed in a color having a high saturation) and that the energy transmission corresponding to a creep torque is being performed but the driving wheels are not actually driven (stopped: displayed in an achromatic color). As a result, the usability is improved.

Whether the vehicle 10 is traveling is determined based on whether the traveling speed of the vehicle 10 detected by the vehicle speed sensor 108 is equal to or higher than a predetermined value.

In addition, the transmission state display control unit 204 further displays, for example, between the battery display Bi and the driving wheel display Ti, the second transmission display F2 indicating the transmission of the energy from the battery 106 to the driving wheels and the third transmission display F3 indicating the transmission of the energy from the driving wheels to the battery 106.

Figure 7:
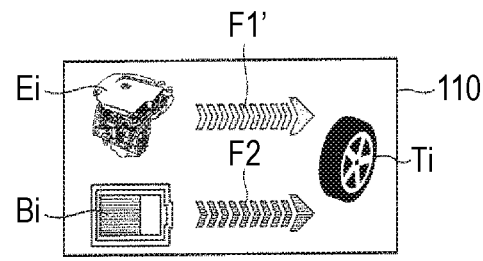
FIG. 7 is an explanatory diagram showing a display example of a display.
Figure 8:
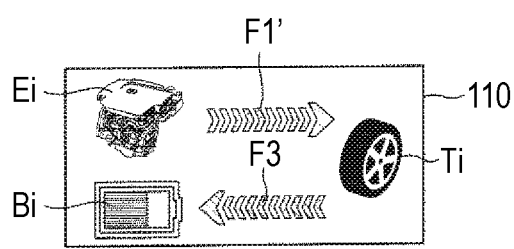
FIG. 8 is an explanatory diagram showing a display example of a display.
Figure 9:
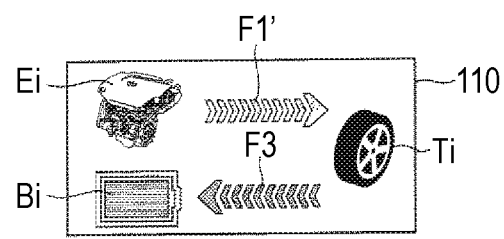
FIG. 9 is an explanatory diagram showing a display example of a display.

FIGS. 7 to 9 are display examples of the second transmission display F2 and the third transmission display F3.

The second transmission display F2 indicates a state (for example, during the acceleration assist, during the fuel consumption assist, or the like) in which the motor generator 104 is operated as a motor by using the electric power of the battery 106 to apply a rotational force to the driving wheels, and is represented by an arrow directed from the battery display Bi to the driving wheel display Ti as shown in FIG. 7 in the present embodiment.

In addition, the third transmission display F3 indicates a state (for example, during the regenerative power generation or during the fuel power generation) in which the battery 106 is charged by operating the motor generator 104 as a generator using the rotational force of the driving wheels, and is represented by an arrow directed from the driving wheel display Ti to the battery display Bi as shown in FIG. 8 in the present embodiment.

That is, the transmission state display control unit 204 displays the second transmission display F2 when the driving wheels are driven by the motor generator 104, and displays the third transmission display F3 when the regenerative power generation is performed by the motor generator 104.

The second transmission display F2 and the third transmission display F3 are different from each other only in the direction of the arrow in terms of the shape, and may be difficult to recognize by the driver during driving. Therefore, for example, the display colors of the second transmission display F2 and the third transmission display F3 may be different from each other. More specifically, it is conceivable that, for example, the second transmission display F2 is displayed in blue, and the third transmission display F3 is displayed in green.

In this case, a color of the charging rate display in the battery display Bi is the same as the color of the second transmission display F2. That is, the transmission state display control unit 204 displays the second transmission display F2 in the same color as the charging rate display of the battery display Bi. Accordingly, the flow of the energy from the battery 106 to the driving wheels can be represented more clearly.

Here, in a state where the battery 106 is nearly fully charged, the battery 106 may not be charged with the electric power generated by the motor generator 104 by the regenerative power generation. In such a case, the electric power generated by the regenerative power generation is not supplied to the battery 106, and is consumed by other components of the vehicle 10.

Therefore, the transmission state display control unit 204 may change a display mode of the third transmission display F3 between a case where the charging rate of the battery 106 is equal to or higher than a predetermined value and the battery 106 cannot be charged with the electric power generated by the regenerative power generation and a case where the battery 106 is charged with the electric power generated by the regenerative power generation.

Specifically, for example, when the battery 106 can be charged with the electric power generated by the regenerative power generation, the third transmission display F3 is displayed in green (chromatic color) as shown in FIG. 8. On the other hand, when the charging rate of the battery 106 is high and the electric power generated by the regenerative power generation cannot be received, the third transmission display (denoted by F3') is displayed in gray (achromatic color) as shown in FIG. 9. FIG. 9 shows that the indicator of the battery display Bi is nearly fully charged.

That is, in a case where the charging rate of the battery 106 is equal to or higher than the predetermined value and the battery 106 cannot be charged with the electric power generated by the regenerative power generation, the transmission state display control unit 204 displays the third transmission display in a color having a saturation lower than that in a case where the battery is charged with the electric power generated by the regenerative power generation.

Accordingly, the driver can intuitively recognize whether the battery 106 is being charged during deceleration in which the regenerative power generation is performed.

In addition, the third transmission display F3' in FIG. 9 is displayed in gray similarly to the first transmission display F1 in FIG. 5. That is, the transmission state display control unit 204 sets the display color of the first transmission display F1, in the case where the vehicle 10 is stopped during the display of the first transmission display F1, to be the same as the display color of the third transmission display F3 in the case where the charging rate of the battery 106 is equal to or higher than the predetermined value and the battery 106 cannot be charged with the electric power generated by the regenerative power generation. Accordingly, although the energy transmission is possible, the state in which the energy transmission is not performed due to the state of the vehicle is represented by the same color, thereby giving a sense of unity between the displays and allowing the driver to recognize the state of the vehicle more intuitively.

Figure 3:
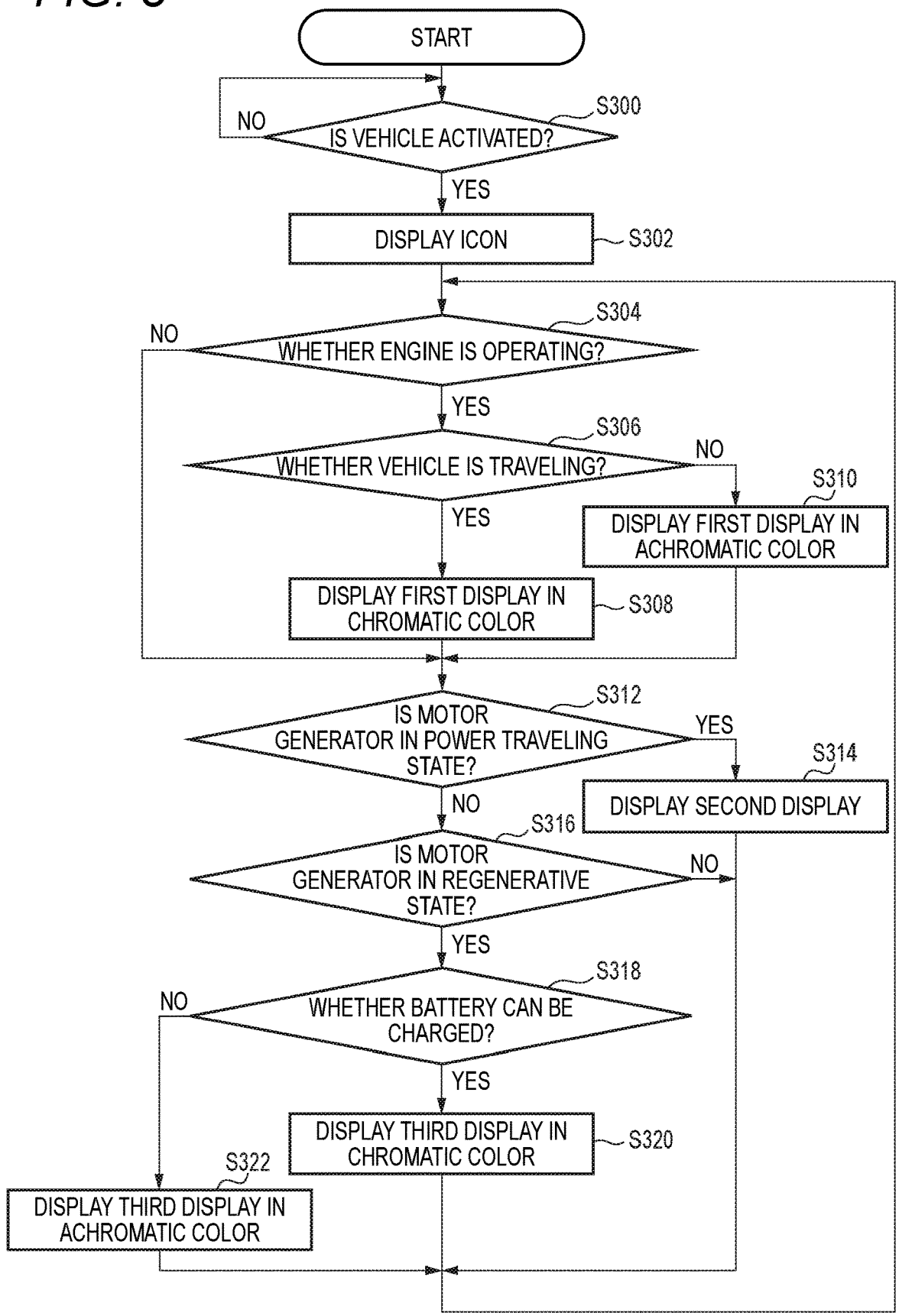
FIG. 3 is a flowchart showing an operation of the vehicle state display device.

FIG. 3 is a flowchart showing an operation of the vehicle state display device.

When the vehicle 10 is activated (step S300), the vehicle configuration display control unit 202 displays the engine display Ei, the driving wheel display Ti, and the battery display Bi (denoted as "icon" in the drawing) on the display 110 (step S302).

The transmission state display control unit 204 determines whether the engine 102 is operating (step S304), and when the engine 102 is not operating (step S304: No), the processing proceeds to step S312.

When the engine 102 is operating (step S304: Yes), the transmission state display control unit 204 further determines whether the vehicle 10 is traveling (step S306). When the vehicle 10 is traveling (step S306: Yes), the transmission state display control unit 204 displays the first transmission display F1 (denoted as "first display" in the drawing) from the engine display Ei toward the driving wheel display Ti in a chromatic color (step S308). In addition, when the vehicle 10 is stopped (step S306: No), the transmission state display control unit 204 displays the first transmission display F1' from the engine display Ei toward the driving wheel display Ti in an achromatic color (for example, gray) (step S310).

In addition, the transmission state display control unit 204 determines an operation state of the motor generator 104 (steps S312 and S314), and when the motor generator 104 is in a power traveling state (step S312: Yes), the transmission state display control unit 204 displays the second transmission display F2 (denoted as "second display" in the drawing) from the battery display Bi toward the driving wheel display Ti in, for example, a chromatic color (step S314).

In addition, when the motor generator 104 is in a regenerative state (step S316: Yes), the transmission state display control unit 204 determines whether the battery 106 can be charged with the electric power generated by the regenerative power generation (step S318). When the battery 106 can be charged (step S318: Yes), the transmission state display control unit 204 displays the third transmission display F3 (denoted as "third display" in the drawing) from the driving wheel display Ti toward the battery display Bi in a chromatic color (step S320). On the other hand, when the battery 106 cannot be charged (step S318: No), the transmission state display control unit 204 displays the third transmission display F3 from the driving wheel display Ti toward the battery display Bi in an achromatic color (step S322).

During the activation of the vehicle 10, the vehicle state display device returns to step S304 and repeats the subsequent processing.

As described above, the vehicle state display device according to the embodiment displays the first transmission display F1 indicating the transmission of the energy between the engine 102 and the driving wheels during the operation of the engine 102, and stops the display of the first transmission display F1 during the stop of the engine 102. Accordingly, it is possible to switch the presence or absence of the display of the first transmission display F1 in conjunction with the operation state of the engine 102, which is easily recognized by the driver, and it is possible to prevent a deviation from occurring between the display of the vehicle state display device and the feeling of the driver.

In addition, since the vehicle state display device changes the display mode of the first transmission display F1 based on whether the vehicle 10 is traveling during the display of the first transmission display F1, it is possible to cause the driver to recognize whether the energy is actually transmitted from the engine 102 to the driving wheels. For example, when the vehicle 10 is traveling, the first transmission display F1 is displayed in a color having a saturation higher than when the vehicle 10 is stopped, such that the driver can intuitively recognize the presence or absence of the energy transmission.

In addition, the vehicle state display device displays the second transmission display F2 indicating the transmission of the energy from the battery 106 to the driving wheels and the third transmission display F3 indicating the transmission of the energy from the driving wheels to the battery 106. Accordingly, it is possible to display the operation state of the motor generator 104, which is difficult for the driver to recognize.

In addition, since the vehicle state display device changes the display mode of the third transmission display F3 between the case where the charging rate of the battery 106 is equal to or higher than the predetermined value and the battery 106 cannot be charged with the electric power generated by the regenerative power generation and the case where the battery 106 is charged with the electric power generated by the regenerative power generation, it is possible to cause the driver to recognize the flow of the electric power accompanying the regenerative power generation in more detail.

The present application is based on Japanese Patent Application No. 2020-011586 filed on Jan. 28, 2020, the contents of which are incorporated herein as reference.

REFERENCE SIGNS LIST

10: vehicle
102: engine
104: motor generator
106: battery
110: display unit (display)
20: ECU (vehicle state display device)
202: vehicle configuration display control unit
204: transmission state display control unit
Bi: battery display
Ei: engine display
Ti: driving wheel display
F1: first transmission display
F2: second transmission display
F3: third transmission display

The invention claimed is:

1. A vehicle state display device of a vehicle including an engine configured to drive driving wheels, the vehicle state display device comprising:
a display configured to display an energy transmission state of the vehicle;
a vehicle configuration display configured to display, on the display, an engine display representing the engine and a driving wheel display representing the driving wheels; and
a transmission state display configured to control a contour of a first transmission display having an arrow shape and color saturation of a region within the contour, the first transmission display being displayed between the engine display and the driving wheel display, and indicating a transmission of energy between the engine and the driving wheels, wherein
the first transmission display linearly extends from the engine display toward the driving wheel display, and
the transmission state display is configured to:
display the said contour of the first transmission display during operation of the engine;
indicate that the transmission of energy toward the driving wheels, corresponding to a creep torque, is being performed by keeping the displaying of the said contour of the first transmission display in a case where the vehicle is stopped and during the operation of the engine; and
change the color saturation of the region within the said contour of the first transmission display in a case where the vehicle is traveling and during the operation of the engine, as compared with the case where the vehicle is stopped and during the operation of the engine.

2. The vehicle state display device according to claim 1, wherein

In a case where the vehicle is traveling while the first transmission display is displayed, the transmission state display is configured to display the region within the contour of the first transmission display in a color having a saturation higher than that in a case where the vehicle is stopped while the first transmission display is displayed.

3. The vehicle state display device according to claim 1, wherein the vehicle configuration display is configured to further display, on the display, a charging rate display representing a charging rate of the battery, and the transmission state display is configured to display the second transmission display in the same color as the charging rate display.

4. The vehicle state display device according to claim 1, wherein the vehicle further includes a motor generator configured to operate using the electric power to drive the driving wheels, and to perform a regenerative power generation using a rotational force of the driving wheels to supply the electric power to the battery during a deceleration of the vehicle, and the transmission state display is configured to display the second transmission display when the driving wheels are driven by the motor generator, and to display the third transmission display when the regenerative power generation is performed by the motor generator.

5. The vehicle state display device according to claim 4, wherein the transmission state display is configured to change a display mode of the third transmission display between a case where the charging rate of the battery is equal to or higher than a predetermined value and the battery is not capable of being charged with the electric power generated by the regenerative power generation and a case where the battery is charged with the electric power generated by the regenerative power generation.

6. The vehicle state display device according to claim 4, wherein in a case where the charging rate of the battery is equal to or higher than a predetermined value and the battery is not capable of being charged with the electric power generated by the regenerative power generation, the transmission state display is configured to display the third transmission display in a color having a saturation lower than that in a case where the battery is charged with the electric power generated by the regenerative power generation.

7. The vehicle state display device according to claim 4, wherein the transmission state display is configured to set a display color of the first transmission display in a case where the vehicle is stopped while the first transmission display is displayed, and a display color of the third transmission display in a case where the charging rate of the battery is equal to or higher than a predetermined value and the battery is not capable of being charged with the electric power generated by the regenerative power generation as the same.

* * * * *